US009489657B2

(12) United States Patent
Chudge et al.

(10) Patent No.: US 9,489,657 B2
(45) Date of Patent: Nov. 8, 2016

(54) AGGREGATION AND VISUALIZATION OF MULTIPLE CHAT ROOM INFORMATION

(75) Inventors: Jarnail Chudge, Reading (GB); Fred Warren, Birmingham (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1137 days.

(21) Appl. No.: 13/400,782

(22) Filed: Feb. 21, 2012

(65) Prior Publication Data

US 2013/0218987 A1    Aug. 22, 2013

(51) Int. Cl.
*G06F 15/16* (2006.01)
*G06F 3/00* (2006.01)
*G06Q 10/10* (2012.01)
*H04L 12/58* (2006.01)
*H04L 12/18* (2006.01)

(52) U.S. Cl.
CPC .......... *G06Q 10/10* (2013.01); *H04L 12/1813* (2013.01); *H04L 51/04* (2013.01)

(58) Field of Classification Search
CPC ..... G06Q 10/10; H04L 51/04; H04L 12/581; H04L 12/1831; H04L 67/24; H04L 12/1818; H04L 12/1827; H04L 51/043; H04L 51/16
USPC .................. 709/205–206, 203, 204, 224; 715/751–759
See application file for complete search history.

(56) References Cited

U.S. PATENT DOCUMENTS

| | | | |
|---|---|---|---|
| 5,072,412 A | | 12/1991 | Henderson, Jr. et al. |
| 6,346,952 B1 * | | 2/2002 | Shtivelman .................... 715/758 |
| 7,127,685 B2 * | | 10/2006 | Canfield et al. .............. 715/842 |
| 8,434,008 B2 * | | 4/2013 | Bhide et al. .................. 715/752 |
| 2002/0138380 A1 | | 9/2002 | Naismith et al. |
| 2003/0210265 A1 * | | 11/2003 | Haimberg ..................... 345/758 |
| 2005/0027802 A1 * | | 2/2005 | Madsen et al. ............... 709/204 |
| 2005/0228866 A1 * | | 10/2005 | Endler et al. ................ 709/206 |
| 2006/0085515 A1 * | | 4/2006 | Kurtz et al. .................. 709/207 |
| 2006/0117380 A1 * | | 6/2006 | Tachizawa et al. ............... 726/4 |
| 2007/0143410 A1 * | | 6/2007 | Kraft et al. ................... 709/206 |

(Continued)

OTHER PUBLICATIONS

Chung, et al., "VizCept: Supporting Synchronous Collaboration for Constructing Visualizations in Intelligence Analysis", Retrieved at <<http://rahulkanna.com/vast_vizcept.pdf>>,Proceedings of IEEE Symposium on Visual Analytics Science and Technology, Oct. 24-29, 2010,pp. 107-114.

(Continued)

*Primary Examiner* — David Lazaro
(74) *Attorney, Agent, or Firm* — Nicholas Chen; Kate Drakos; Micky Minhas

(57) ABSTRACT

The information made available in a series of chat windows which each represent a different chat room is summarized and displayed in a single chat window summary screen. In this way a user can monitor a single window in a single display rather than many windows occupying a series of displays. When one of the chat room summaries indicates something of interest to the user, the user may return to a view of the entire chat window for that chat room. In some implementations the user may designate one or more of the chat room summaries as an active window. The active window may include more information in its summary that the chat room summaries for the remaining chat room summaries which are not designated as active windows.

19 Claims, 8 Drawing Sheets

(56) References Cited

U.S. PATENT DOCUMENTS

| | | | |
|---|---|---|---|
| 2007/0174407 A1* | 7/2007 | Chen et al. | 709/207 |
| 2008/0005254 A1* | 1/2008 | Adolphs et al. | 709/207 |
| 2009/0157709 A1* | 6/2009 | Kruger et al. | 707/100 |
| 2010/0037151 A1* | 2/2010 | Ackerman et al. | 715/753 |
| 2010/0223272 A1* | 9/2010 | Beckley et al. | 707/758 |
| 2012/0023113 A1* | 1/2012 | Ferren et al. | 707/751 |
| 2012/0179502 A1* | 7/2012 | Farooq et al. | 705/7.13 |
| 2013/0014035 A1* | 1/2013 | Won et al. | 715/758 |

OTHER PUBLICATIONS

Venolia, et al., "Understanding Sequence and Reply Relationships within Email Conversations: A Mixed-Model Visualization", Retrieved at <<http://research.microsoft.com/pubs/74256/p361-venolia.pdf>>,Proceedings of the 2003 Conference on Human Factors in Computing Systems, CHI 2003, Ft. Lauderdale, Florida, USA, Apr. 5-10, 2003, pp. 361-368.

Biefang, Matt, "The Next Generation of Traders: Can We Meet Their Needs Today?", Retrieved at <<http://blogs.msdn.com/b/businesstalk/archive/2011/01/28/the-next-generation-of-traders-can-we-meet-their-needs.aspx>>, Jan. 28, 2011, pp. 2.

Author Unknown, "Infographic of the Day: 3-D Model Unlocks Secrets of Twitterverse [Video]", Retrieved at <<http://www.fastcodesign.com/1663694/infographic-of-the-day-3-d-model-unlocks-secrets-of-twitterverse-video>>, Retrieved Date: Dec. 30, 2011, pp. 5.

\* cited by examiner

Communication Center
File  Edit  View  Contact  Room  Tools  Help

Active          ∧ None hidden
☐ Global_Oil_Trading
☐ Asia_Oil_Trading
☐ Robert Tompkins - Goldin Bank
☐ David Wright - Barron Bank
☐ Peter Johnson - Indian Wells Group
☐ Julia Lee - Indian Wells Group
☐ Hugh Jassmoth - Indian Wells Group

Favorites       ∧ None hidden

▶ New Group
  None
▼ Other Contacts (5/13)
  ○ David Wright - Barron Bank
  ○ Hugh Jassmoth - Indian Wells Group
  ○ Julia Lee - Indian Wells Group
  ○ Peter Johnson - Indian Wells Group
  ○ Robert Tompkins - Goldin Bank
  ○ Anita Gnap - Indian Wells Group
  ○ Edan Shafrir - Barron Bank
  ○ James Smith - Goldin Bank
  ○ Jonathan Losman - Barron Bank
  ○ Melissa Milano - Barron Bank
  ○ Nathalie Thomas - Goldin Bank
  ○ Robert Carey - Indian Wells Group
  ○ Ross McFarland - Goldin Bank
▼ Other Rooms
  # Asia_Oil_Trading (Open)
  # Global_Oil_Trading (Open)

410

412

Incoming Messages

| From/To | Last Date/Time |
|---|---|
| Global_Oil_Trading - Hugh Jassmoth - tarryfund.com | 3:40 PM 12/16/2008 The rec... |
| Asia_Oil_Trading - Hannah Evans - barronbank.com | 3:40 PM 12/16/2008 <http... |
| Peter Johnson - in... rmchat://room/barronbank.com/Global_Oi... | 3:37 PM 12/16/2008 |
| Hugh Jassmoth-I... | 3:33 PM 12/16/2008 |

404

Current

◆ More History  & Alerts...

Global_Oil_Trading
Discuss ongoing oil trends, news and activity
Companys barronbank.com memberships room membership is limited to those from barronbank.com and selected
Other Participants

| Time | From | Domain | Message |
|---|---|---|---|
| 3:38:13 PM | David Wright | barronbank.com | To be frank the biggest culprit pushing higher oil price%... |
| 3:38:26 PM | Julia Lee | tarryfund.com | The FED just cut the rates again |
| 3:38:30 PM | David Wright | barronbank.com | Bonny liquidity will be even worse than it has been recently-please be advised that spreads might widen |
| 3:38:30 PM | Hannah Evans | barronbank.com | Asia oil brokers brace for crisis-induced shakeup |
| 3:38:37 PM | David Wright | barronbank.com | early Access WTI deals to 09 low so bids around this M and we squeeze back 69.00 - NG deals as high as 7.4000 where we top with bids from hedge funds |
| 3:38:38 PM | Julia Lee | tarryfund.com | its 0 - 0.25 |
| 3:39:29 PM | David Wright | barronbank.com | be assured that plenty of officials will be happy to talk and answer prickly questions on the euro-so may get some juicy info |
| 3:39:39 PM | David Wright | barronbank.com | You are going to be waiting a long time before you find anyone quoting a CIF price to an unnamed destination or opening an LC before there is a contract. |
| 3:40:17 PM | David Wright | barronbank.com | The hedge funds are betting crude oil price will reach US$80 with in 2 years |
| 3:40:20 PM | David Wright | barronbank.com | due to lower US$, persistent terrorism threat and booming demand from china and India for jet fuel and petrol. |
| 3:40:47 PM | Hugh Jassmoth | tarryfund.com | The recent financial turmoil has greatly affected oil trading negatively |

402

[Send] 408

406

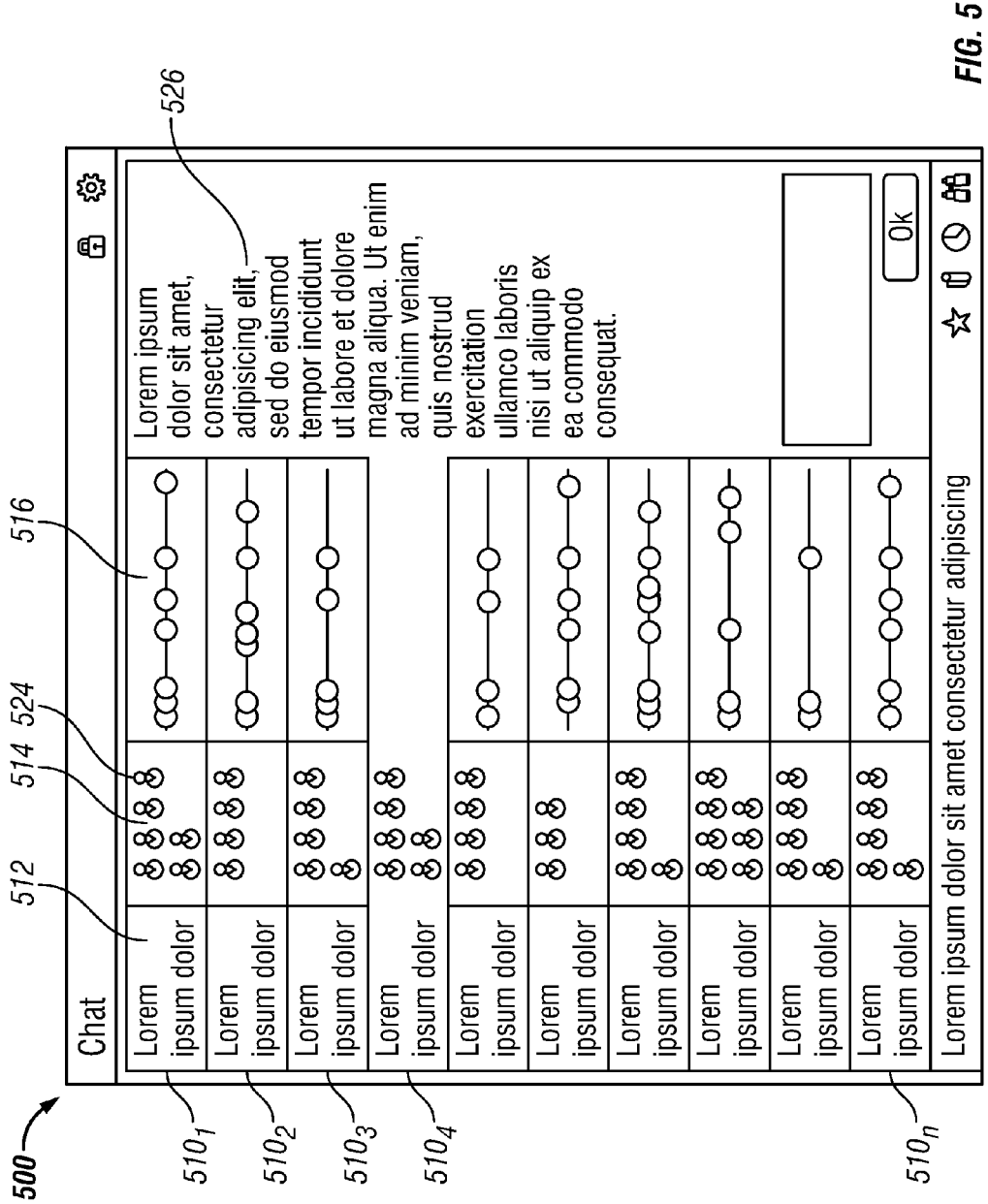

AGGREGATION AND VISUALIZATION OF MULTIPLE CHAT ROOM INFORMATION

BACKGROUND

A variety of communication methods involving the use of computer networks have been developed in recent years in accordance with the growth of the Internet. Such methods include chat systems, multi-user and real-time communication methods. A chat messaging system is a means through which conversation, typically text-based, is sent from a sender to a recipient via a computer network, namely the Internet, almost instantly.

A client computer running a software application allowing one user to chat with another user on the same network can be termed a chat client. A chat room refers to the chat forum created by the users chatting via chat clients and matching servers (also referred to as chat servers). A chat user may chat using multiple chat services, which may be associated with the same or different chat servers.

Chat applications are often used by individuals conducting business. For instance, financial traders often use a number of different chat-related services such as Bloomberg Chat, Thomson Reuters Eikon, Communicator, Messenger and so on. By utilizing chat messaging, business users can view each other's availability and initiate a text conversation with colleagues or customers when a desired contact becomes available. Millions of users communicate using chat messaging systems every day. With chat messaging becoming an significant part of both personal and business communications, functionality and usability enhancements can be important to the continued success of this type of communication tool.

Chat messages received during a chat session are typically presented to a user in a window that may be referred to as a chat window. Users of chat clients often maintain multiple chat sessions simultaneously, each of which may be viewed in a different chat window. It is not unusual for users to have ten or more chat sessions ongoing at the same time. Financial traders in particular, may be monitoring and contributing to 20-30 ongoing chat sessions at any given time. Since each of these chat sessions may be presented in their own chat window, a large amount of screen space needs to be devoted to them. In fact, financial traders may often use between two and three displays to monitor all these chat sessions at the same time. In addition to the chat sessions they are actively monitoring, traders may have upwards of 3-8 different displays in use at any given time.

SUMMARY

The information made available in a series of chat windows which each represent a different chat room is summarized and displayed in a single chat window summary screen. In this way a user can monitor a single window in a single display rather than many windows occupying a series of displays. This can be particularly advantageous when the window is presented on a small form-factor device such as a smartphone.

When one of the chat room summaries indicates something of interest to the user, the user may return to a view of the entire chat window for that chat room. In some implementations the user may designate one or more of the chat room summaries as an active window. The active window may include more information in its summary that the chat room summaries for the remaining chat room summaries which are not designated as active windows. In some cases the additional information included in the active window which is not available in the non-active windows includes the ongoing conversation of the participants.

In one implementation, each chat room summary occupies a horizontal band across the screen and includes the chat room title, the number of participants, and an infographic that reflects the amount of activity or "traffic" that is taking place in the chat room.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 4 shows one example of a chat window that may be presented on the display of a chat client by a chat application.

FIG. 5 shows one example of a chat summary window that summarizes the activity taking place in a series of chat rooms.

DETAILED DESCRIPTION

In order to reduce the amount of screen space that is used to monitor multiple chat rooms, a system is provided which monitors the activity taking place in multiple chat rooms that a user wishes to monitor and extracts information from them which is used to summarize the activity occurring in each of them. The summaries of each chat room are aggregated and placed in a single chat summary window. In this way a single window may be used to monitor the various conversations and the level of activity that is occurring in multiple chat rooms. Such an arrangement can be particularly useful when the form factor of the device being used to display the chat windows becomes smaller and more restricted, such as is the case with mobile communication devices.

Figure 1:
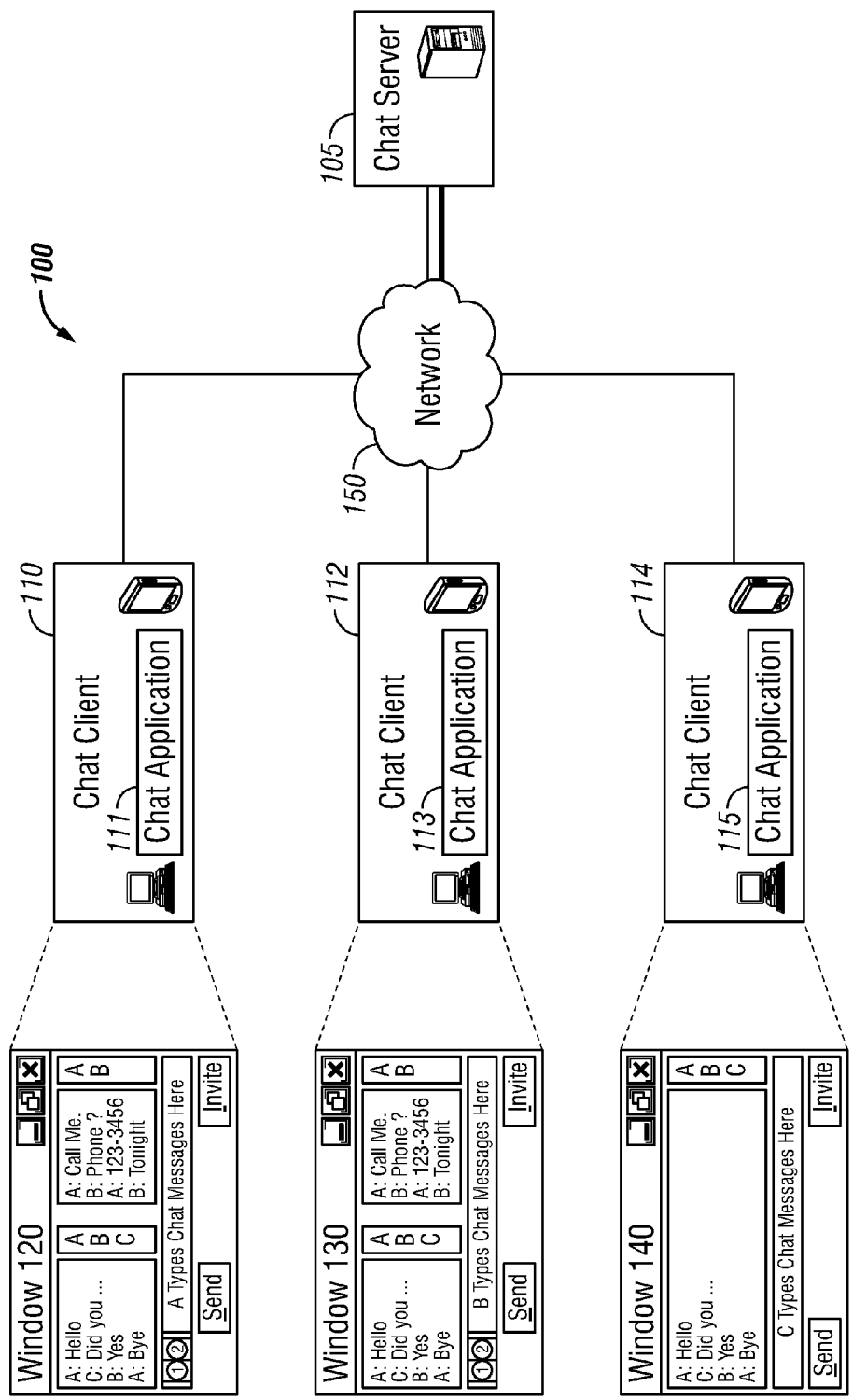
FIG. 1 is a block diagram illustrating a network environment for supporting chat communications.

FIG. 1 is a block diagram illustrating a network environment for supporting chat communications. Referring to FIG. 1, network environment 100 includes chat server 105 for providing chat services to one or more chat clients 110, 112 and 114 over a network 150. Chat server 105 may be any kind of device that facilitates online chat discussions such as a server that maintains one or more chat rooms. Chat clients 110, 112 and 114 may be any kind of computing devices, such as, for example, laptop or desktop computers, personal digital assistants (PDAs), cellular phones, etc.

Each of the chat clients 110, 112 and 114 includes a chat client application 111, 113 and 155, respectively. A chat application communicates between a chat client and a chat server to facilitate chat communications and presence state updates. Additionally, each of chat clients 104-105 may include multiple chat client applications or multiple instances of a chat client application, where each chat client application may support chat communications via the same or a different chat service provider. Further, a chat client application may be a stand-alone application or may be integrated into an operating system of a chat client or into another application executing on the chat client, such as a web browser.

In facilitating chat communications between chat clients, chat server 105 may support chat communications in multiple formats including, but not limited to, chat rooms, instant messaging, Internet Relay Chat (IRC), and text messaging via multiple types of media including, but not limited to, text, voice, graphics, video, and file transfer.

In addition, in facilitating chat communications between chat clients, chat server 105 may support monitoring the presence state of each user currently logged in through a chat client and distributing the presence state of each user to other users logged in through other chat clients. For example, the presence of the user logged in at chat client 110 may be broadcast via chat server 105 to chat clients 112 and 114 because the users logged in at these chat clients have requested to monitor the presence of the user logged in at chat client 110.

Each chat client 110, 112 and 114 can utilize a chat interface such as chat window 120, 130 and 140 to participate in chat sessions. In this example window 120 can be associated with Participant A, window 130 can be associated with Participant B, and window 140 can be associated with Participant C. Chat windows 120 and 140 show a public chat session involving Participant A, Participant B, and Participant C and chat window 130 shows a chat session involving a subset of the public chat session participants, such as Participant A and Participant B. This arrangement allows members of the public chat session to engage in private sidebar conversations, while still participating in the public chat session.

Although environment 100 shows three participants (Participants A, B, and C) in one chat session and two participants (Participants A and B) in another chat session, any number of participants can be included in either chat session. Additionally, each participant is not limited to two simultaneous chat sessions.

Communications network 150 can include local components and data pathways used to exchange communications among computing device components and between integrated device components and peripheral devices, including chat server 105 and chat clients 110, 112 and 114. The communications network 150 can comprise the Internet, the World Wide Web, a wide area network (WAN), a local area network (LAN), a cellular communications network, an interconnect communications network, a public switched telephone network (PSTN), and/or any other public, private and/or federated networks or systems over which communication signals can be propagated. In that regard, the communications network 150 can include wired and/or wireless communication links.

Figure 2:
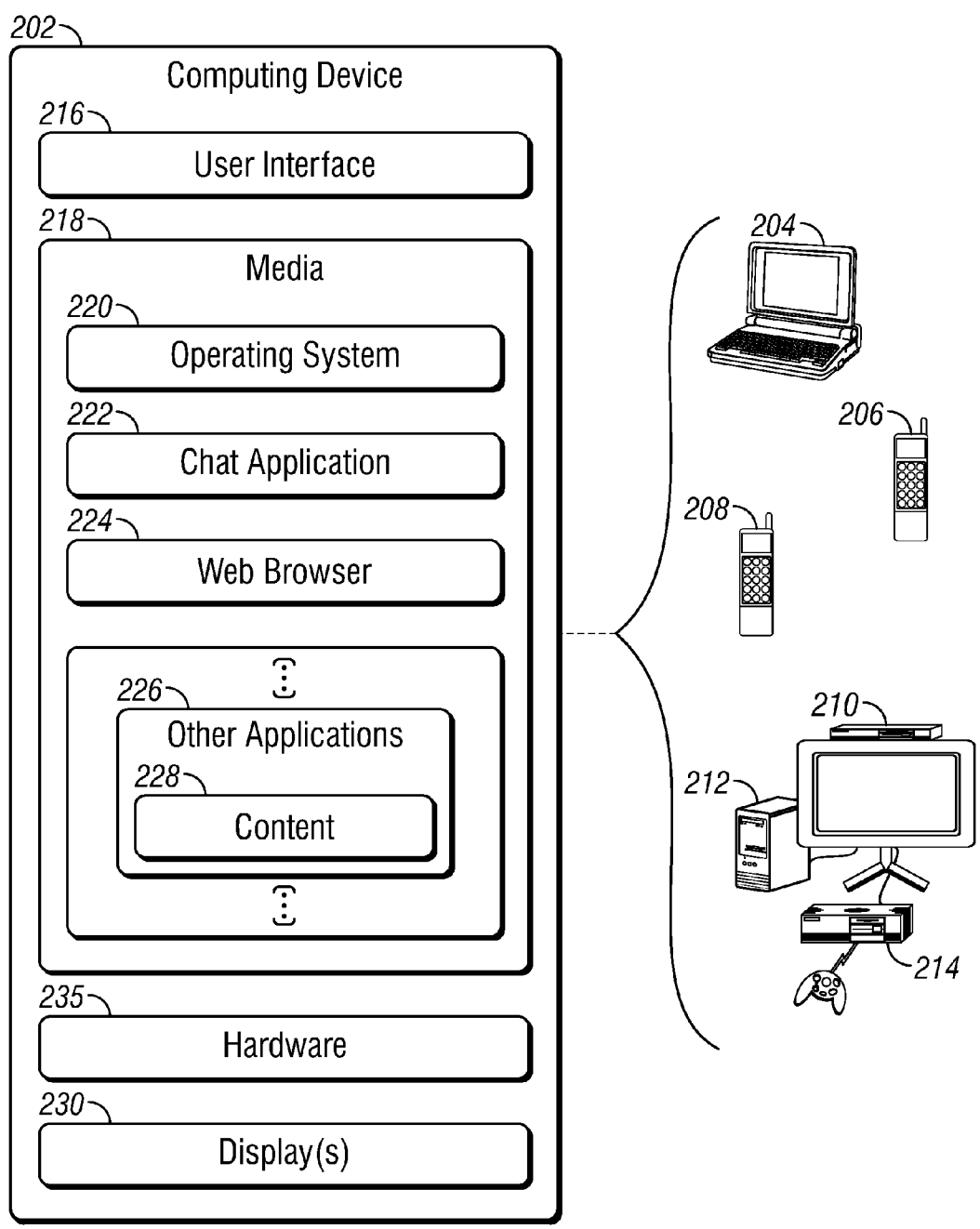
FIG. 2 illustrates an example of a computing device that may serve as a chat client.

FIG. 2 illustrates an example of a computing device 202 that may serve as any of chat clients 110, 112 and 114 shown in FIG. 1. Computing device 202 is illustrated with six examples: a laptop computer 204, a tablet computer 206, a smart phone 208, a set-top box 210, a desktop computer 212, and a gaming device 214, though other computing devices and systems, such as servers and netbooks, may also be used.

Computing device 202 includes user interface 216, computer-readable storage media 218 (media 218), hardware 235 and display 230. The user interface 216 is provided to support user interactivity and facilitate an effective user experience, and will typically be embodied as a graphical user interface, which in some cases may be provided on a touch screen display which may include, for example, gesture control. User interface 216 may also, or alternatively, include such components as a keyboard, mouse and the like. Media 118 includes an operating system 220, chat application 222, web browser 224 and other applications 226, some of which may provide content 228. Chat application 222, web browser 224 and/or operating system 220 can be separate from each or they may be combined or integrated in some form. The user interface may include or have access to, among other things one or more displays 230, examples of which are illustrated in FIG. 1.

The hardware layer 235 provides an abstraction of the physical hardware implemented on the device $115_1$ to the operating system 220 and applications 205, 220, and 225 above it. For example, such physical hardware may typically include a processor (e.g., a central processor or "CPU"), system memory such as read only memory ("ROM") and random accessory memory ("RAM"), bus structures, peripheral systems, drives, display devices, user controls and interfaces, etc. The hardware may also include storage media for storing computer-executable instructions (i.e., code) including either or both removable media and non-removable media such as magnetic and optical media, solid-state memory, and other conventional media. Display 230 and other portions of the user interface 216 may be some specific components of hardware 235.

Figure 3:
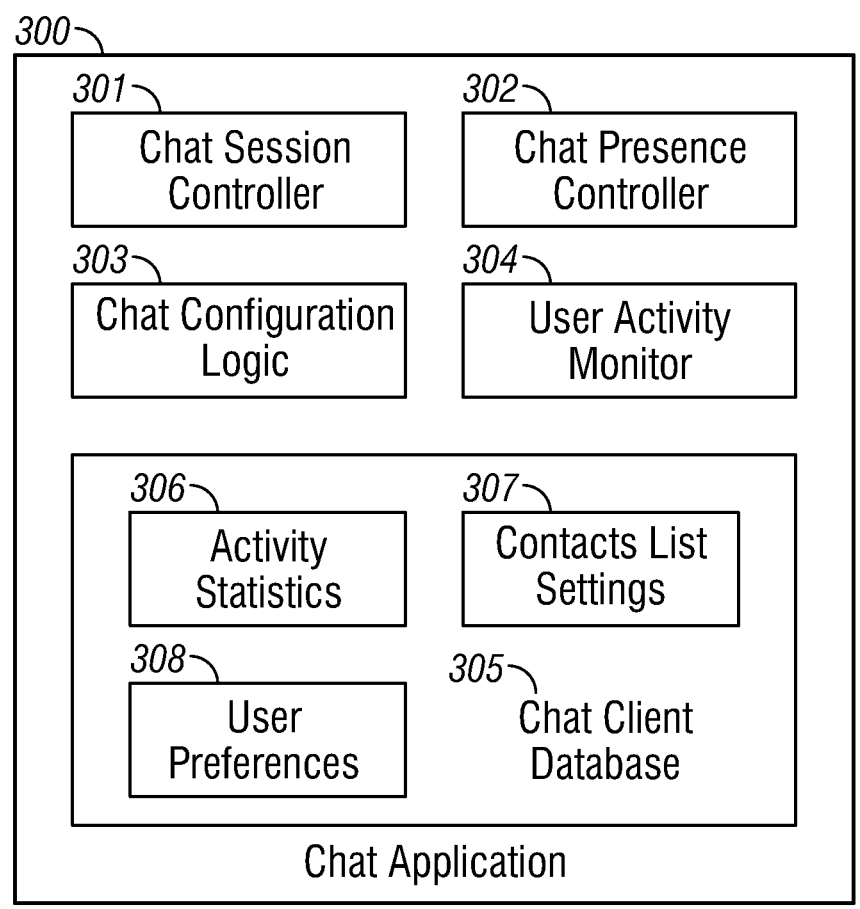
FIG. 3 is a block diagram illustrating one example of a chat application.

FIG. 3 is a block diagram illustrating one example of a chat application such as chat application 322 shown in FIG. 2. This example is presented for purposes of illustration only. More generally, a wide variety of different chat applications may be employed, including, but not limited to, the aforementioned financial services chat applications used by financial traders. Chat client 300 may include a chat session controller 301, a chat presence controller 302, chat configuration logic 303, a user activity monitor 304, and a chat client database 305 to store a variety of data such as activity statistics 306, buddy list settings 307, and user preferences 308, etc.

Chat session controller 301 is configured to enable a local user to select to communicate via a chat session with a remote user who is logged on and receiving chat session requests, and to communicate with another users via a chat session. Additionally, chat sessions controller 301 handles received requests from other users requesting communication with the local user via a chat session (e.g. chat requests). Upon receipt of a request from another user to chat with the local user, chat sessions controller 301 may alert the local user to the chat request.

Chat presence controller 302 may broadcast the presence state of the local user to a chat server (e.g., chat server 105 of FIG. 1) which in turn broadcasts the presence state to other users. In addition, chat presence controller 302 may directly broadcast the presence state for the local user to another chat client. Chat presence controller 302 is configured to enable the local user to select a particular presence state for broadcast to other users. In one implementation, chat presence controller 302 enables the local user to select a particular presence state by selecting from among multiple indicators of availability. Chat presence controller 302 also controls how the presence states for other users are output to the local user. In one example, the local user adds user identifiers to a contacts list, where the contacts list indicates those users whose presence state the local user automatically requests to monitor. User identifiers added to a contacts list are included in contacts list settings 307. Further, within a contacts list, as stored in contacts list settings 307, the local user may specify groups of users, such as family groups, business groups, friend groups, and other user definable groups.

In some implementations, the users in the contacts list settings may be identified by a user name and may include multiple chat services for one or more chat systems. In addition, each chat service may further include information indicating whether the corresponding chat service supports certain features such as video chat, etc.

User activity monitor 304 is configured to monitor a variety of activities performed by the local user and the statistics of the user activities may be stored in activity statistics database 306. Among other things, such information may be used to infer which of the chat services may be selected to initiate a chat session under certain circumstances. Chat configuration logic 303 is configured to allow a local user to customize user preferences 308 and contacts list settings 307. The chat configuration logic 303 may also allow a user to override certain automatic settings performed by chat client 300. Chat session controller 301 is configured to automatically select a chat service of a local user and/or remote user based on a variety of information such as activity statistics 306, contacts list settings 307, and user preferences 308, as set forth above.

For example, when a local user wishes to initiate a chat session with a remote user, the local user may simply select the username of the remote user without having to specifically select a chat service of the remote user. In response to the selection, chat session controller 301 may analyze all of the chat services associated with the remote user and/or the local user, as well as the recent activities of the local user and/or remote user, which may be previously collected and/or computed, and stored in activity statistics 306, contacts list settings 307, and user preferences 308. Based on the analysis, the chat session controller 301 may automatically select one of the chat services. Thereafter, the local user may override the automatic selection by the system and the system may "learn" from the user manual selection to be used for future selections.

Note that components as shown in FIG. 3 are described for the purpose of illustration only; more or fewer components may also be implemented. Also note that some or all of the components as shown in FIG. 3 may be implemented in software, hardware, or a combination of both.

FIG. 4 shows one example of a chat window 400 that may be displayed on the display of a chat client by a chat application. Chat window 400 includes a conversation display area 402 that shows the user's current ongoing instant messaging chat in chat room 404 along with previous messages in the conversation. The user may enter text in dialog area 408 to participate in the conversation. When composing a response, the user may select the send button 406 or execute other appropriate keystrokes to send the text entered into dialog area 408 so that it will be displayed in conversation display area 402. The chat window 400 also includes a participant area 410 showing the names of the current participants in the chat room and a favorites area 412 listing the user's contacts who may participate in the chat.

As previously mentioned, chat windows such as the window 400 shown in FIG. 4 can occupy a large portion of the available screen area. This can make it difficult to monitor several different chat rooms at the same time. For instance, a financial trader may utilize 2-3 chat applications at any given time while monitoring and participating in between upwards of perhaps 20-30 different chat rooms. As a consequence the trader may use several displays at the same time in order to display all the chat windows.

In order to reduce the screen space occupied by a series of chat windows, a summary of information available in each chat window is extracted and aggregated into a single window. In this way substantial screen space is saved while allowing the user to monitor many different chat windows at the same time on a single screen. Moreover, by reducing the amount of information provided by each summary relative to the information available in the full chat window, the user can quickly identify when significant activity is taking place in any given chat room which may require the user's more complete attention. Additionally, the information provided by each summary may be customizable by the user.

The summary window may also allow one of the chat rooms to be designated as the currently 'active' chat window. This window may provide additional details of the activity taking place in that chat room. For instance, the active chat window may provide the full-text view of the ongoing dialogue or conversation that is taking place in that chat room. The summaries provided for the non-active chat rooms may also convey a sense of 'traffic' through the use of infographics indicating when contributions to the chat room were made. In addition, a series of supporting controls may be provided which enable the user to order, rank, drill down, search, and filter each chat summary, such that the chat service, through internal analysis, will be able to provide a stronger visual cue, generally via an infographic, to the end-user regarding who they chat with most frequently, the topics of discussion, and so on, to establish the relative importance and significance of their relationship.

FIG. 5 shows one example of a chat summary window 500 that summarizes the activity taking place in a series of chat rooms. Each chat room summary occupies a distinct region of the display. In this particular example each chat room summary $510_1$, $510_2$, ... $510_n$ occupies a horizontal band across the screen and clearly show a number of subregions such as the chat room title 512, the number of participants 514, and an infographic 516 (i.e., a visual graphic representation of information) that reflects the amount of activity or "traffic" that is taking place in the chat room. In this particular example each participant in the chat room is represented by an icon 524. In some cases when a user places the cursor or other screen pointer over the icon 524 (sometimes referred to as a mouseover or mouse hover), a graphical user interface (GUI) event occurs which displays the name of the individual or organization represented by the icon. In other implementations the number of participants may be indicated in other ways, such as by a single numeral, for instance.

In the illustrative chat summary window of FIG. 5 the user has designated chat room summary $510_4$ as the currently active chat room summary. As a consequence this chat room summary provides additional information that is not provided in the summaries of the other chat rooms. In this particular example the additional information includes the full-text view of the dialogue that is being conducted in that chat room. As shown, the full-text is presented in a dialogue box 526 that is displayed in a column along the rightmost edge of the chat summary window 500. Of course, the dialogue box may be alternatively displayed in other ways and other locations as well within the chat summary window 500. The use of a dialogue box 526 that extends in a horizontal column may be particularly convenient when a touch-screen is employed because it lends itself more readily to common touch manipulation techniques such as pinch and zoom and swipe to scroll.

The non-active chat room summaries include an infographic 520 which indicates when contributions to the chat room are made by participant. In this way the chat room summary conveys a sense of the activity level or traffic in the chat room. In the example of FIG. 5 the infographic is arranged as a timeline on which a node (e.g., circles 522) is displayed whenever a participant contributes to the chat room. In some cases the area occupied by the nodes (e.g., the area of circles 522) may represent the volume of traffic that is present in the chat room at any particular time. Alternatively, the nodes may be displayed in different colors which represent different amounts of traffic or other relevant parameters of the chat room.

The timeline on which the nodes are located in FIG. 5 progresses from left to right so that the current time is represented by the rightmost end of the horizontal line. That is, proceeding along the timeline from right to left represents progressively more remote times in the past. The duration or period of the timeline may be a user-adjustable parameter. In some implementations a user may place the cursor or other screen pointer over the node (or selects the node) so that a graphical user interface (GUI) event occurs which displays, for instance, the name of the individual and time details of the individual(s)' contributions to the chat room. Of course, this GUI may present additional or alternative information as well. The nodes or other infographics may also present a visual indicators of the growth rate in the number of participants in a chat room conversation. This can be accomplished in any suitable manner by adjusting the size, color, shape, etc., of the nodes or other infographics. This feature may be significant owing to the need to understand not just the number of participants at any given time, but whether the number of participants is trending upwards or downwards and at what rate.

Chat summary window 500 may provide a number of user-controls such as GUIs or the like which allow adjustment and customization of a variety of other user-configurable settings. For instance, in some cases a series of supporting controls may enable the user to order, rank, drill down into, search, and filter the chat room summaries. In addition, the user may configure the height and/or width of the window 500 depending on where they want to position it on the chat application and how much real-estate they wish to devote to it.

The chat summary window 500, through internal analysis by the application generating it, will be able to provide a stronger visual cue, via infographics, to the end-user regarding who they chat with most frequently, the topics of discussion, and so on, to establish the relative importance and significance of their relationship. For instance, the internal analysis performed by the application may include text searching in accordance with either user-defined and/or system-generated rules in order to provide context to the ongoing conversation in the chat. If the searched text is found in the dialog box 526 of the active chat summary, the window will automatically bring the pertinent section of text into view. In addition, the significance and relevance of the chat may be highlighted via the infographic(s) that are employed. In this way, should the user notice that something of interest has been highlighted they can select the highlighted item on the infographic to further determine its significance.

Figure 6:
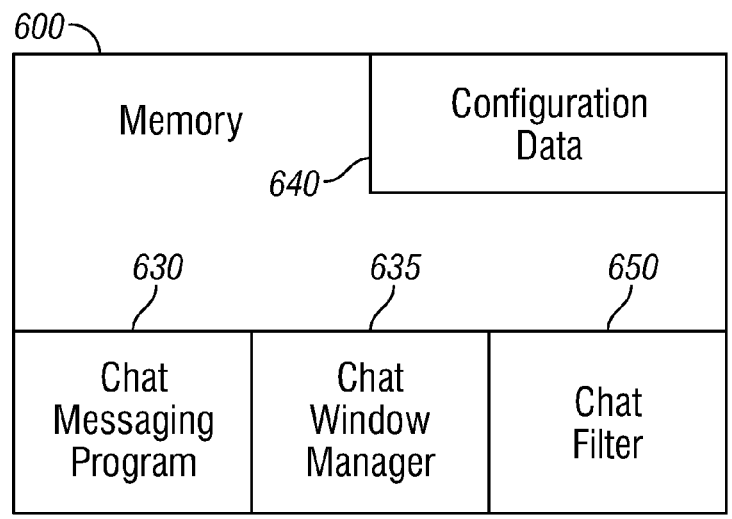
FIG. 6 shows a memory that may store data and programs to deliver chat services to chat clients such as the chat clients shown in FIG. 1.

FIG. 6 shows a memory 600 that may store data and programs to deliver chat services to chat clients such as the chat clients shown in FIG. 1. Memory 600 may reside on or be associated with a chat server (e.g., chat server 105 in FIG. 1). In some cases, where sufficient processing resources are available, the memory 600 may even be hosted by the client. The term "memory," as used herein, includes without limitation any volatile or persistent storage medium, such as an electrical circuit, magnetic disk, or optical disk, in which a computer can store data or software. A single memory may encompass and be distributed across a plurality of media and network nodes.

Memory 600 may include chat messaging program 630, configuration data component 640, Chat window manager 635 and chat filter 650. Chat messaging program 630 represents any messaging software that provides an interface though which a user accesses a messaging service using a client messaging application in order to exchange messages with other users. Configuration data component 640 represents any data source (including without limitation a file, table, or database) that identifies one or more of a user's preferences for displaying or filtering information about chat windows. Chat window manager 635 organizes chat windows and chat summary windows for display on chat clients and may includes user-controllable interface features for adjusting and customizing how chat windows and chat summary windows are displayed. As previously discussed, features that may be customized include the location and size of the chat summary windows as well as display attributes such as font, text size and color. Other display attributes that may be customized include selection of the icons and infographics that are used in the summary windows, as well as their size, shape and color.

Chat window manager 635 manages the creation and placement of the various windows in a chat message application and may display information about open chat messaging sessions in those windows. Filter 650 augments chat window manager 635 and provides additional controls for the user to configure the content that chat window manager 635 displays in those windows. Filter 650 serves to analyze the plurality of messages in order to extract a summary of activity taking place in the two or more chat rooms. In practice, chat filter 650 may be integrated with chat messaging program 530, but also may exist independently as an add-on module.

Figure 7:
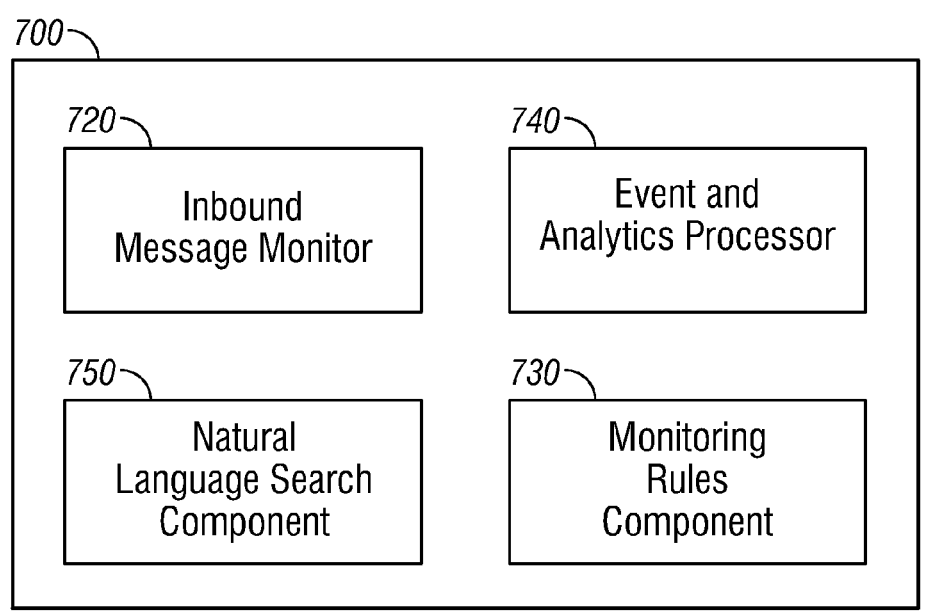
FIG. 7 shows one example of a chat filter.

One example of chat filter 650 is shown in FIG. 7. In this example the components of chat filter 650 are stored in a memory 700, which may or may not be the same as memory 600 shown in FIG. 6. Memory 700 may include inbound message monitor 720, rules component 730, natural language search component 750 and event and analytics processor 740. Chat messages received by a chat server are filtered and processed by inbound message monitor 720 prior to undergoing further processing by the other various components shown in FIG. 6. In particular, inbound message monitor 720 receives various chat messages destined for chat clients who subscribe to the chat service(s) being offered. Inbound message monitor 720 then searches the messages to identify any text that matches or otherwise conforms to pre-defined monitoring rules located in rules component 730. The pre-defined monitoring rules that are applied may include both user-defined monitoring rules as well as system-determined rules. Monitoring of the messages may be facilitated with the use of a natural language search component 750 which can identify not only matching text but also text that is similar to or related to search terms that may have been provided as part of the pre-defined monitoring rules.

After input message monitor 720 has processed the chat message to identify the occurrence of significant events in them which need to be highlighted or otherwise brought to the attention of the user in the chat summary window, the chat messages are passed to event and analytics processor 740, which identifies the chat room to which the messages belong and parses, extracts and analyzes the data from the messages that are to be included in the chat room summaries for each chat room. Data to be included in each chat room summary of the chat summary window 500, including analytics that are used in determining the appropriate icon(s) and infographic(s), may be passed to chat window manager of FIG. 6 so that the data may be incorporated into a format suitable for presentation in chat window summary 500 in accordance with configuration data stored in configuration data component 640.

Figure 8:
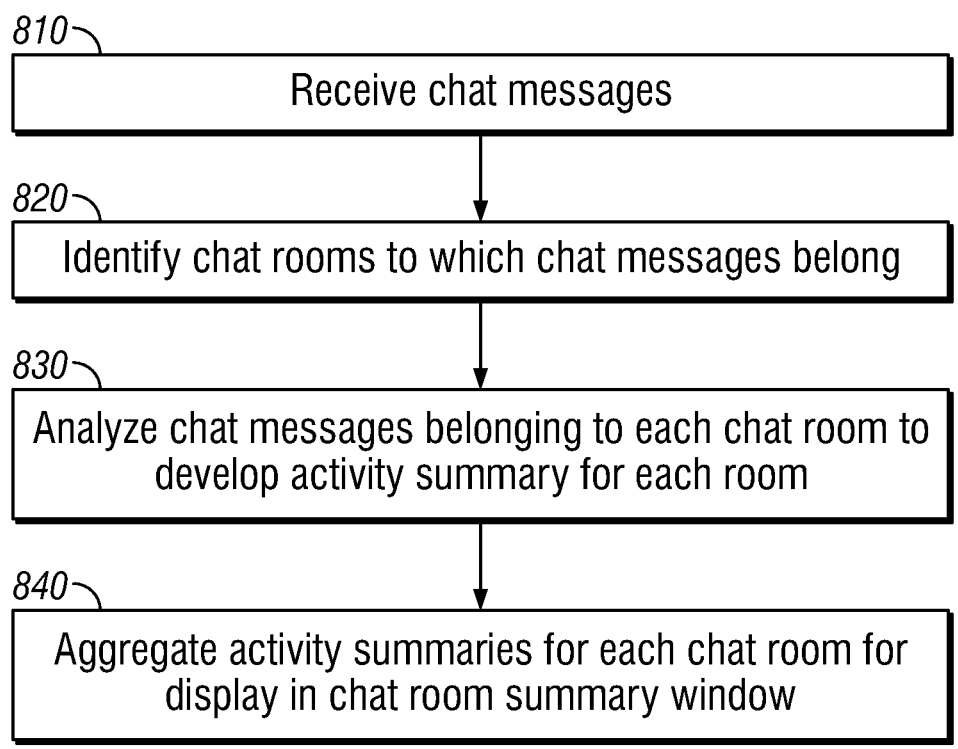
FIG. 8 is a flowchart showing one example of a method for presenting a summary of chat sessions to a user.

FIG. 8 is a flowchart showing one example of a method for presenting a summary of chat sessions to a user. The method begins in step 810 when chat messages are received by e.g., a server, over a communication network. The messages belong to two or more different chat rooms. The chat room to which each message belongs is identified in step 820. The chat messages belonging to each chat room are analyzed in step 830 to develop a summary of activity taking place in each room. In step 840 the activity summaries for the various chat rooms are aggregated for presentation on a display into a single chat room summary window.

Figure 9:
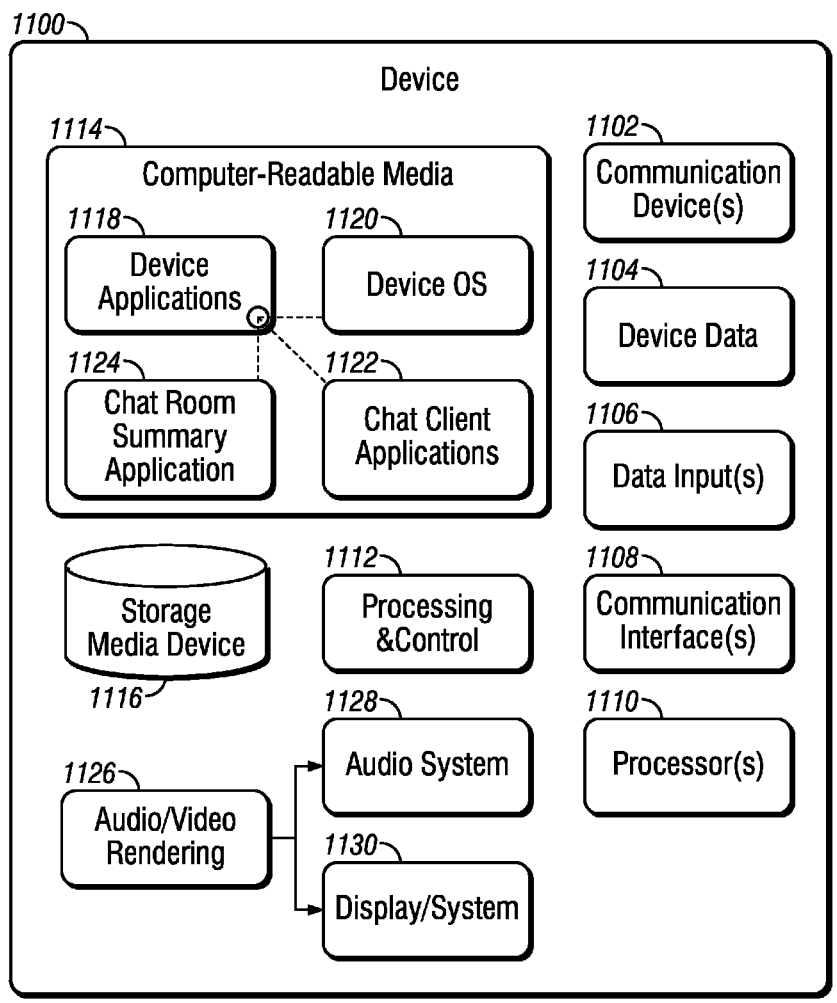
FIG. 9 illustrates various components of an example device that can be implemented as any type of client, server, and/or computing device as described with reference to the previous figures to implement techniques for presenting summaries of multiple chat rooms.

FIG. 9 illustrates various components of an example device 1100 that can be implemented as any type of client, server, and/or computing device as described with reference to the previous figures to implement techniques for presenting summaries of multiple chat rooms. In various embodiments, device 1100 can be implemented as one or a combination of a wired and/or wireless device, as a form of television client device (e.g., television set-top box, digital video recorder (DVR), etc.), consumer device, computer device, server device, portable computer device, user device, communication device, video processing and/or rendering device, appliance device, gaming device, electronic device, and/or as another type of device. Device 1100 may also be associated with a user (e.g., a person) and/or an entity that operates the device such that a device describes logical devices that include users, software, firmware, and/or a combination of devices.

Device 1100 includes communication devices 1102 that enable wired and/or wireless communication of device data 1104 (e.g., received data, data that is being received, data scheduled for broadcast, data packets of the data, etc.). Device data 1104 or other device content can include configuration settings of the device, media content stored on the device, and/or information associated with a user of the device. Media content stored on device 1100 can include any type of audio, video, and/or image data. Device 1100 includes one or more data inputs 1106 via which any type of data, media content, and/or inputs can be received, such as user-selectable inputs, messages, music, television media content, recorded video content, and any other type of audio, video, and/or image data received from any content and/or data source.

Device 1100 also includes communication interfaces 1108, which can be implemented as any one or more of a serial and/or parallel interface, a wireless interface, any type of network interface, a modem, and as any other type of communication interface. Communication interfaces 1108 provide a connection and/or communication links between device 1100 and a communication network by which other electronic, computing, and communication devices communicate data with device 1100.

Device 1100 includes one or more processors 1110 (e.g., any of microprocessors, controllers, and the like), which process various computer-executable instructions to control the operation of device 1100 and to implement embodiments for managing an immersive environment. Alternatively or in addition, device 1100 can be implemented with any one or combination of hardware, firmware, or fixed logic circuitry that is implemented in connection with processing and control circuits that are generally identified at 1112. Although not shown, device 1100 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 1100 also includes computer-readable storage media 1114, such as one or more memory devices that enable persistent and/or non-transitory data storage (in contrast to mere signal transmission or propagation), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 1100 can also include a mass storage media device 1116.

Computer-readable storage media 1114 provides data storage mechanisms to store device data 1104, as well as various device applications 1118 and any other types of information and/or data related to operational aspects of device 1100. For example, device operating system 1120 can be maintained as a computer application with computer-readable storage media 1114 and executed on processors 1110. Device applications 1118 may include a device manager, such as any form of a control application, software application, signal-processing and control module, code that is native to a particular device, a hardware abstraction layer for a particular device, and so on.

Device applications 1118 also include any system components or modules to implement techniques for presenting summaries of multiple chat rooms. In this example, device applications 1118 can include chat client applications 1122, such as when device 1100 is implemented as a client device. Alternatively or in addition, device applications 1118 can include chat room summary applications 1124, such as when device 1100 is implemented as a chat summary service. Chat client applications 1122 and chat room summary applications 1124 are shown as software modules and/or computer applications. Alternatively or in addition, chat client applications 1122 and/or chat room summary applications 1124 can be implemented as hardware, software, firmware, or any combination thereof.

Device 1100 also includes an audio and/or video rendering system 1126 that generates and provides audio data to an audio system 1128 and/or generates and provides display data to a display system 1130. Audio system 1128 and/or display system 1130 can include any devices that process, display, and/or otherwise render audio, display, and image data. Display data and audio signals can be communicated from device 1100 to an audio device and/or to a display device via an RF (radio frequency) link, S-video link, composite video link, component video link, DVI (digital video interface), analog audio connection, or other similar communication link. In an embodiment, audio system 1128 and/or display system 1130 are implemented as external components to device 1100. Alternatively, audio system 1128 and/or display system 1130 are implemented as integrated components of device 1100.

As used in this application, the terms "component," "module," "engine," "system," "apparatus," "interface," or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable storage medium embedded with a computer executable program, which encompasses a computer program accessible from any computer-readable storage device or storage media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). However, computer readable storage media do not include transitory forms of storage such as propagating signals, for example. Of course, those skilled in the art will recognize many modifications may be made to this configuration without departing from the scope or spirit of the claimed subject matter.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A computer-implemented method, comprising:
  receiving over a communications network a plurality of chat messages from two or more different chat rooms;
  analyzing the plurality of messages to extract a summary of activity taking place in the two or more chat rooms, wherein the summary of activity further includes a chat room summary to be presented on a distinct region of the display for each of the two or more chat rooms, the distinct region of a plurality of the chat room summaries each including a plurality of subregions, a first subregion presenting one or more infographics reflecting an amount of participant activity in its respective chat room, wherein the infographics provide a real-time indication of a participant's activity in its respective chat room; and
  causing the summary of activity to be presented on a display.

2. The computer-implemented method of claim 1, a second of the subregions including a title of its respective chat room and a third of the subregions including one or more icons indicating a number of participants currently in its respective chat room.

3. The computer-implemented method of claim 2 wherein the icons in the third subregion each represent one chat room participant, said icons being configured to display an identifier of the respective chat room participants when a screen pointer is placed thereover.

4. The computer-implemented method of claim 1 in which the one or more infographics further includes a timeline representing an historical amount of participant activity over a prescribed period of time.

5. The computer-implemented method of claim 4 in which the prescribed period of time is user configurable.

6. The computer-implemented method of claim 1 in which one of the chat room summaries is designated by a user as an active chat room summary, said active chat room summary including a scrolling full-text display of an ongoing dialog by participants in the chat room, and wherein remaining additional chat room summaries.

7. The computer-implemented method of claim 6 in which each non-active chat room summary extends along a horizontal row of the display and the scrolling full-text display of the active chat room summary extends in a vertical column alongside the non-active chat room summaries.

8. The computer-implemented method of claim 1 in which analyzing the plurality of messages includes monitoring each of the chat messages to identify text that conforms to pre-defined rules and including in the summary of activity that is presented on the display highlighted text that conforms to the pre-defined rules.

9. The computer-implemented method of claim 1 in which the one or more infographics further indicates whether participant activity in the chat room is increasing or decreasing over time.

10. The computer-implemented method of claim 1 wherein a node is displayed whenever a participant contributes to the chat room.

11. The computer-implemented method of claim 10, wherein an area occupied by the node represents a volume of traffic present in the corresponding chat room at a particular time.

12. The computer-implemented method of claim 10, wherein the nodes are displayed in different colors representing different amounts of traffic or other relevant parameters of the chat room.

13. A computing device, comprising:
  a processor and associated memory being configured to execute user-interactive components; and
  a chat room summary component executable by the processor and being configured to monitor and analyze a plurality of chat messages associated with two or more chat rooms to extract from each chat message information for incorporation into a summary of activity taking place in each of the two or more chat rooms, and to aggregate the summary of activity taking place in each of the two or more chat rooms into a chat summary window for presentation on a display,
  wherein the chat room summary window includes a distinct region for the summary of activity taking place in each of the chat rooms, each distinct region being divided into a plurality of subregions, a first subregion including one or more infographics reflecting an amount of participant activity in its respective chat room, wherein the infographics provide a real-time indication of a participant's activity in its respective chat room.

14. The computing device of claim 13, a second of the subregions including a title of its respective chat room and a third of the subregions including one or more icons indicating a number of participants currently in the respective chat room.

15. The computing device of claim 13 in which the infographics further illustrate a historical amount of participant activity over a prescribed period of time.

16. The computing device of claim 14 in which one of the chat rooms is designated by a user as an active chat room, the distinct region for the active chat room including a scrolling full-text display of an ongoing dialog by participants in the chat room.

17. The computing device of claim 16 in which the distinct region for each non-active chat room extends along a horizontal row of the chat room summary window and the scrolling full-text display of the active chat room summary extends in a vertical column alongside the non-active chat room summaries.

18. A computer readable storage medium storing executable instructions which, when executed using a processor, performs a method comprising:
  receiving a plurality of chat room summaries, each of the chat room summaries representing activity transpiring in a different chat room in which a user participates;
  arranging the plurality of chat room summaries into a chat summary window to be presented on a display; and
  presenting the chat summary window on the display,
    wherein each of the plurality of chat room summaries include one or more infographics indicating in real-time whether participant activity in the respective chat rooms is increasing or decreasing over time.

19. The computer readable storage medium of claim 18 in which at least one of the chat room summaries includes highlighted text that conforms to user-defined rules.

* * * * *